United States Patent Office 2,768,132
Patented Oct. 23, 1956

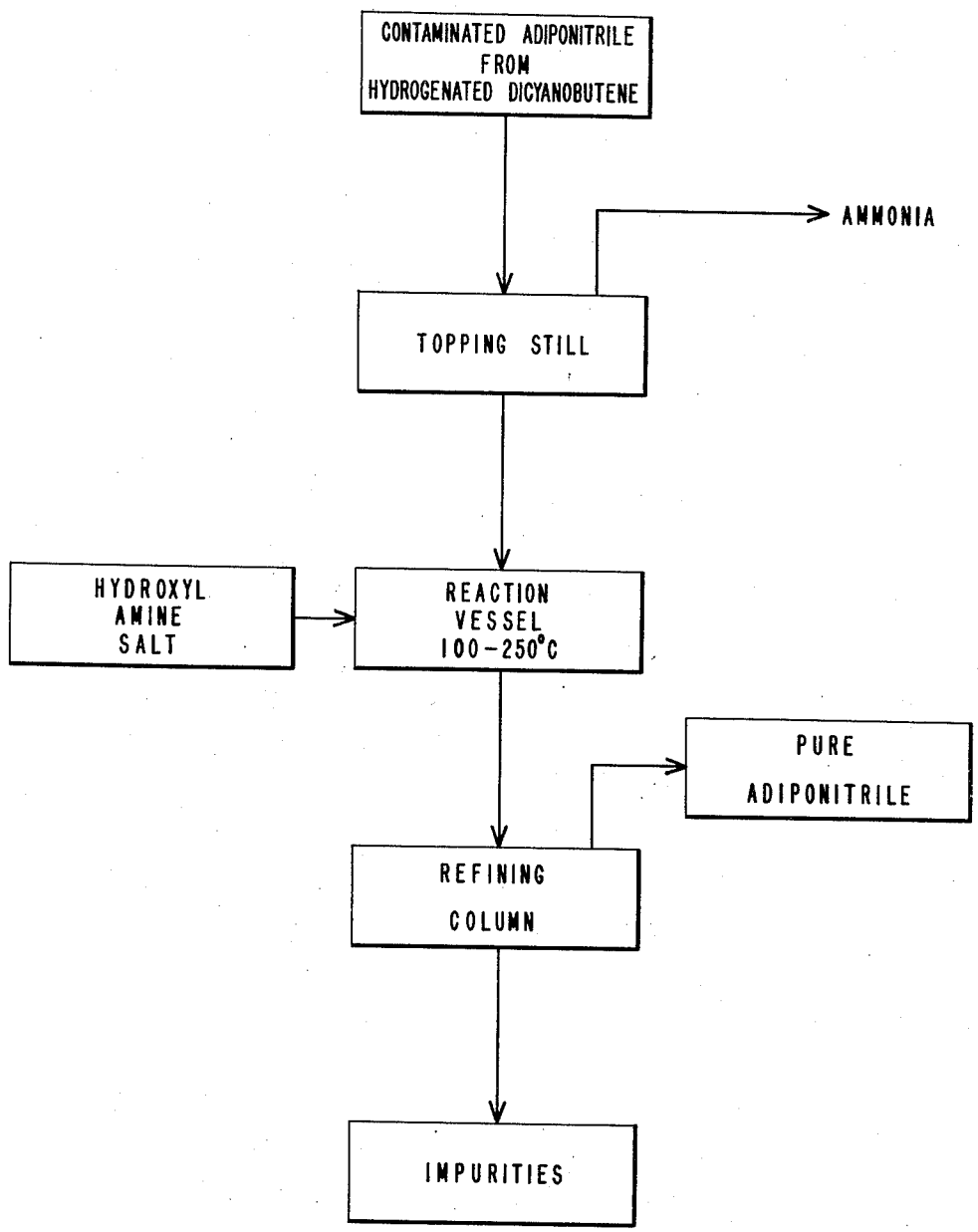

2,768,132
PROCESS FOR PURIFICATION OF AN ADIPONITRILE

Ronald H. Halliwell, Victoria, Tex., assignor to E. I. du Pont de Nemours and Company, Wilmington, Del., a corporation of Delaware Application September 13, 1954, Serial No. 455,771

5 Claims. (Cl. 202—57)

This invention relates to the purification of aliphatic organic polynitriles and more particularly to the preparation of adiponitrile having a high degree of purity.

One of the more important uses of adiponitrile, at the present time, is in the preparation of hexamethylene diamine. This amine is used as a detergent, insecticide, emulsifying agent, and as an intermediate in the preparation of polymeric derivatives. Usually a catalytic hydrogen reaction is employed to convert the adiponitrile to hexamethylene diamine, a reaction which is quite sensitive to the presence of the contaminants normally present in the adiponitrile. Moreover, one of the important uses for adiponitrile is as an intermediate in the preparation of synthetic linear polyamides which are used extensively in the textile industry for the preparation of filaments. It has been established that impurities present in the polyamides are, in many instances, derived from those initially present in the adiponitrile. These impurities cause viscosity variations during spinning which result in non-uniform products.

There are several methods employed for synthesizing adiponitrile, such as the process of U. S. Patent 2,166,150 in which adipic acid is catalytically hydrogenated in the presence of ammonia, U. S. 2,532,311, in which dicyanobutene is similarly hydrogenated under similar conditions, and others. In these processes, active hydrogenation catalysts are employed and the reaction conducted under elevated temperatures and pressures. It has been found that in these as well as in other processes for producing adiponitrile, the involved nature of the reactions results in contaminated products. Some of the impurities present in adiponitrile, prepared by the aforesaid processes, that have been identified are: hydrogen cyanide, adipamic acid, delta-cyanovaleric acid, delta-cyanovaleramide, 2-cyanocyclopentylideneimine, 2-cyanocyclopentanone; cyclopentanone, dicyclopentylidine, tricyclotrimethylene benzene, 1,1-tetramethylene cyclohexanone, 2,3-cyclopentenocycloheptanone, pyrrole, ethyl succinonitrile, valeronitrile, cis and trans 1,4-dicyanoethylcyclohexane, cis and trans 1,4-dicyanobutene- and other unidentified compounds containing imino groups, amine type compounds, and the like. The invention is directed to a process of reducing the concentration of the least desirable of the above contaminants below the most exacting minimum standards.

An object of the present invention is to provide a process for purifying adiponitrile containing the aforesaid impurities that are derived from processes such as have been described, or adiponitrile containing such impurities obtained by any process. A further object of the invention is to provide a process in which the adiponitrile in the reaction mixture in which it is formed, or in any solution in which it is present with impurities, is treated with a hydroxylamine, and the adiponitrile recovered therefrom by fractional distillation or by another suitable process. Other objects and advantages of the invention will hereinafter appear.

In accord with the invention, it has been discovered that aliphatic organic dinitriles, and particularly adiponitrile, of excellent quality and suitable for use as intermediates in processes requiring a high degree of purity in the nitrile used, can be recovered from a reaction mixture, in which the nitrile is present with undesirable quantities of contaminants, by treating the reaction mixture with a hydroxylamine salt of hydrochloric, nitric, sulfuric, or phosphoric acid, or an acid salt of sulfuric or phosphoric acid. The nitrile containing crude reaction mixture is, in one embodiment of the invention, subjected to hydrolysis to convert the imino groups present to ketone groups and the hydrolyzed reaction mixture further reacted with the aforesaid hydroxyl amine salt at an elevated temperature. It is economical to carry out this treatment in the reaction mixture from the synthesis of adiponitrile during the transfer of that mixture to a distillation column or other device used for separating the adiponitrile from the by-products, impurities and other contaminants present. During subsequent distillation, the hydroxylamine reaction products of the impurities in the adiponitrile are separated from the adiponitrile and an exceptionally pure adiponitrile is recovered.

One of the contaminants present in adiponitrile obtained from the catalytic hydrogenation of dicyanobutene is 2-cyanocyclopentylideneimine. This contaminant, although it boils below adiponitrile, is separated from the nitrile only with difficulty. To meet acceptable standards for 2-cyanocyclopentylideneimine, excessive foreshots purges during rectification have been necessary with resultant excessive yield losses. By purification in accord with the invention, this and like contaminants are converted to corresponding oximes and/or other compounds easily separated by simple distillation to give an adiponitrile with a 2-cyanocyclopentylideneimine of less than 10 m. p. m., (i. e. mols per million mols of the nitrile).

The examples which follow describe embodiments of the invention in which parts are by weight unless otherwise stated:

*Example I.*—100 parts of adiponitrile prepared by hydrogenation of dicyanobutene, in accord with a process such as that described in U. S. 2,532,311, with subsequent topping to remove ammonia and some of the low boiling impurities and which contained 530 m. p. m. of 2-cyanocyclopentylideneimine was mixed with 0.20% of molten hydroxylammonium acid sulfate at a temperature of 210° C. The mixture was fed to a refining column maintained at a temperature between 140° C. and 200° C. and a head pressure of 10 mm. from which 90% of the material was taken overhead as a highly purified adiponitrile containing less than 1 m. p. m. of 2-cyanocyclopentylideneimine.

*Example II.*—100 parts of adiponitrile prepared by hydrogenation of dicyanobutene in accord with a process such as that described in U. S. Patent 2,532,311 with subsequent topping to remove ammonia and some of the low-boiling impurities and which contained 115 m. p. m. of 2-cyanocyclopentylideneimine was mixed at room temperature with 0.5 part of a solution prepared by dissolving 10 parts of hydroxylamine hydrochloride in 100 parts of water. The mixture, after heating to 150° C. and holding for two minutes, contained 4 m. p. m. of 2-cyanocyclopentylideneimine.

*Example III.*—100 parts of adiponitrile prepared by hydrogenation of dicyanobutene in accord with a process such as that described in U. S. Patent 2,532,311 with subsequent topping to remove ammonia and some of the low-boiling impurities and which contained 587 m. p. m. of 2-cyanocyclopentylideneimine was well mixed with 0.12 percent hydroxylamine acid sulfate added as a 40 percent solution in water. Without further heating, the mixture was fed to a refining column maintained at a temperature between 140° C. and 200° C. and a head pressure of 10 mm. Ninety percent of the material was taken overhead as a highly purified adiponitrile containing 188 m. p. m. of 2-cyanocyclopentylideneimine. The attached drawing illustrates, by way of a flow sheet, one of the embodiments of the invention.

The purification effected by the process of the invention is applicable generally to the treatment of similarly contaminated aliphatic organic polynitriles. The hydroxylamine salts and acid salts under the conditions of purification described are selective in their action on contaminants with respect to aliphatic organic polynitriles generally and can be removed with facility from the treated reaction mixture.

Since the principal reaction that takes place when a hydroxylamine is heated in a crude reaction mixture containing adiponitrile is that of forming oximes with such compounds as 2-cyanocyclopentyldeneimine, the amount of the hydroxylamine added to assist in the separation should be gauged accordingly. If the degree of contamination is known, a stoichiometric amount of the hydroxylamine will usually be adequate to remove the contaminants with the addition of 5 to 10% by weight in excess, and the resulting mixture heated to a temperature between 100 to 250° C. and preferably between 160° C. and 190° C. for a period of time sufficient, usually between 1 and 3 minutes, to allow the reaction to take place.

While the simplest method of removing the hydroxylamine reaction products is by distillation or fractionation, other methods may be used, such, for example, as by extraction with a solvent for the product that is a non-solvent for the adiponitrile, or any other established method for the separation of organic compounds having dissimilar vapor pressures and/or solubility characteristics.

The slight degree of acidity left in the adiponitrile after treatment can be neutralized by any suitable method, such for example, as by passing the adiponitrile over or through a bed of weakly basic material such as lime, limestone, dolomite, and the like to remove the effect of the salt used.

It is understood that the foregoing examples are illustrative of preferred embodiments of the invention, and that numerous other embodiments will come within the scope of this invention as is well known to those skilled in this art.

I claim:

1. In a process for the purification of an adiponitrile, contaminated with by-products formed during its synthesis, the steps which comprise heating the contaminated adiponitrile with a compound selected from the group consisting of hydroxylamine salts of hydrochloric, nitric, sulfuric, and phosphoric acids and hydroxylamine acid salts of sulfuric and phosphoric acids, and thereafter separating the resultant purified dinitrile from the reaction mixture.

2. In a process for the purification of an adiponitrile, contaminated with by-products formed during its synthesis, the steps which comprise heating the contaminated adiponitrile with a compound selected from the group consisting of hydroxylamine salts of hydrochloric, nitric, sulfuric, and phosphoric acids and hydroxylamine acid salts of sulfuric and phosphoric acids, at a temperature between 100 and 250° C., and separating the purified dinitrile from the reaction mixture by distillation.

3. In a process for the purification of adiponitrile, contaminated with by-products formed during its synthesis, the steps which comprise subjecting an aqueous solution of the contaminated adiponitrile to a treatment with a compound selected from the group consisting of hydroxylamine salts of hydrochloric, nitric, sulfuric, and phosphoric acids and hydroxylamine acid salts of sulfuric and phosphoric acids, at elevated temperatures, and separating the purified adiponitrile from the reaction mixture by distillation.

4. In a process for the purification of adiponitrile, obtained by the catalytic hydrogenation of dicyanobutene, the steps which comprise treating the crude hydrogenation mixture with a compound selected from the group consisting of hydroxylamine salts of hydrochloric, nitric, sulfuric, and phosphoric acids and hydroxylamine acid salts of sulfuric and phosphoric acids, at a temperature between 100 and 250° C., and separating the adiponitrile from the reaction mixture by fractional distillation.

5. In a process for the purification and separation of adiponitrile from a reaction mixture obtained by the catalytic hydrogenation of dicyanobutene, the steps which comprise heating the reaction mixture from the dicyanobutene hydrogenation reaction with a compound selected from the group consisting of hydroxylamine salts of hydrochloric, nitric, sulfuric, and phosphoric acids and hydroxylamine acid salts of sulfuric and phosphoric acids, and thereafter separating the adiponitrile from the hydroxylamine reaction mixture by fractionation.

References Cited in the file of this patent

UNITED STATES PATENTS

| | | |
|---|---|---|
| 2,548,369 | Harwood | Apr. 10, 1951 |
| 2,581,354 | Bordner | Jan. 8, 1952 |